(12) United States Patent
Begen et al.

(10) Patent No.: US 9,312,989 B2
(45) Date of Patent: Apr. 12, 2016

(54) IMPORTANCE-BASED FEC-AWARE ERROR-REPAIR SCHEDULING

(75) Inventors: Ali C. Begen, Santa Clara, CA (US); David R. Oran, Acton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1560 days.

(21) Appl. No.: 12/168,772

(22) Filed: Jul. 7, 2008

(65) Prior Publication Data

US 2010/0005360 A1    Jan. 7, 2010

(51) Int. Cl.
| H04L 1/18 | (2006.01) |
|---|---|
| H04L 1/16 | (2006.01) |
| H04L 1/08 | (2006.01) |
| G06F 11/14 | (2006.01) |
| H04L 1/00 | (2006.01) |

(52) U.S. Cl.
CPC .......... *H04L 1/1845* (2013.01); *G06F 11/1443* (2013.01); *H04L 1/08* (2013.01); *H04L 1/16* (2013.01); *H04L 1/1614* (2013.01); *H04L 1/1621* (2013.01); *H04L 1/1628* (2013.01); *H04L 1/1819* (2013.01); *H04L 1/1867* (2013.01); *H04L 2001/0092* (2013.01); *H04L 2001/0093* (2013.01)

(58) Field of Classification Search
CPC ........... H04L 1/08; H04L 1/16; H04L 1/1819; H04L 1/1845; H04L 1/1614; H04L 1/1621; H04L 1/1628
USPC .................................................. 714/748, 751
See application file for complete search history.

(56) References Cited

U.S. PATENT DOCUMENTS

| 5,444,718 | A | * | 8/1995 | Ejzak et al. .................. 714/748 |
|---|---|---|---|---|
| 5,600,663 | A | * | 2/1997 | Ayanoglu et al. ............ 714/774 |
| 5,784,362 | A | * | 7/1998 | Turina ........................... 370/321 |
| 5,974,028 | A | * | 10/1999 | Ramakrishnan .............. 370/229 |
| 6,278,716 | B1 | | 8/2001 | Rubenstein et al. |
| 6,301,249 | B1 | * | 10/2001 | Mansfield et al. ............ 370/394 |
| 6,445,717 | B1 | * | 9/2002 | Gibson et al. ................ 370/473 |

(Continued)

FOREIGN PATENT DOCUMENTS

| EP | 2220845 | 8/2010 | |
|---|---|---|---|
| WO | WO 2005048519 A1 * | 5/2005 | ............... H04L 1/18 |
| WO | WO 2009/058645 | 5/2009 | |

OTHER PUBLICATIONS

U.S. Appl. No. 11/735,930, David Oran, et al.

(Continued)

*Primary Examiner* — Joseph D Torres
(74) *Attorney, Agent, or Firm* — Patent Capital Group (57) ABSTRACT

A method is provided in one example and includes receiving a loss report usable to determine a plurality of missing packets at a first receiver; determining one or more retransmission packets for retransmission based on a forward error correction (FEC) scheme and the plurality of missing packets at the first receiver, where the one or more retransmission packets are determined to allow the first receiver to recover at least one of the missing source packets in the one or more source packets using the FEC scheme; and sending the one or more retransmission packets to the first receiver, the one or more retransmission packets allowing the first receiver to recover at least one of the missing source packets in the one or more source packets that it is missing using the forward error correction scheme after receiving the one or more retransmission packets.

14 Claims, 6 Drawing Sheets

(56) References Cited

U.S. PATENT DOCUMENTS

| | | | |
|---|---|---|---|
| 6,516,435 B1* | 2/2003 | Tsunoda | 714/751 |
| 6,532,562 B1* | 3/2003 | Chou et al. | 714/776 |
| 6,594,798 B1* | 7/2003 | Chou et al. | 714/820 |
| 6,677,864 B2* | 1/2004 | Khayrallah | 341/50 |
| 6,711,128 B1* | 3/2004 | Ramakrishnan | 370/230 |
| 6,839,325 B2* | 1/2005 | Schmidl et al. | 370/242 |
| 6,909,718 B1* | 6/2005 | Aramaki et al. | 370/394 |
| 6,996,097 B1* | 2/2006 | Chou et al. | 370/389 |
| 7,024,609 B2* | 4/2006 | Wolfgang et al. | 714/748 |
| 7,114,002 B1* | 9/2006 | Okumura et al. | 709/232 |
| 7,224,702 B2 | 5/2007 | Lee | |
| 7,333,439 B2* | 2/2008 | Itoh et al. | 370/252 |
| 7,366,172 B2* | 4/2008 | Chou et al. | 370/389 |
| 7,376,880 B2* | 5/2008 | Ichiki et al. | 714/751 |
| 7,599,363 B2* | 10/2009 | Jang et al. | 370/389 |
| 7,681,101 B2* | 3/2010 | Oran et al. | 714/748 |
| 7,697,514 B2* | 4/2010 | Chou et al. | 370/389 |
| 7,747,921 B2* | 6/2010 | DaCosta | 714/748 |
| 7,801,146 B2* | 9/2010 | Aramaki et al. | 370/394 |
| 7,877,660 B2* | 1/2011 | Ver Steeg | 714/751 |
| 7,881,258 B2* | 2/2011 | Gilbert et al. | 370/329 |
| 7,889,654 B2* | 2/2011 | Ramakrishnan et al. | 370/231 |
| 7,921,347 B2* | 4/2011 | Kim et al. | 714/749 |
| 7,969,883 B2* | 6/2011 | Balint et al. | 370/235 |
| 7,969,997 B1* | 6/2011 | Noh et al. | 370/408 |
| 7,979,784 B2* | 7/2011 | Shao et al. | 714/807 |
| 8,037,392 B1* | 10/2011 | Sahar | 714/776 |
| 2005/0169174 A1 | 8/2005 | Apostolopoulos et al. | |
| 2005/0204242 A1* | 9/2005 | Chou et al. | 714/741 |
| 2006/0198325 A1* | 9/2006 | Gao et al. | 370/270 |
| 2008/0253369 A1 | 10/2008 | VerSteeg et al. | |
| 2009/0119722 A1 | 5/2009 | VerSteeg et al. | |
| 2009/0217318 A1 | 8/2009 | Versteeg et al. | |

OTHER PUBLICATIONS

Chou, et al., "Rate-Distortion Optimized Streaming of Packetized Media", Feb. 2001, 44 pages, Technical Report MSR-TR-2001-35, Microsoft Corporation, Redmond, WA.

PCT Mar. 3, 2009 International Search Report from PCT/US08/80882; 3 pages.

PCT May 4, 2010 International Preliminary Report on Patentability (1 page) and Written Opinion of the International Search Authority (6 pages) from PCT/US08/80882.

Brassil, Jack, et al., "Structuring Internet Media Streams with Cueing Protocols," IEEE/ACM Transactions on Networking, IEEE/ACM New York, NY, vol. 10, No. 4, Aug. 2002, XP011077174; Abstract Only.

Castro, H., et al., "Monitoring Emerging IPv6 Wireless Access Networks," IEEE Wireless Communications, IEEE Service Center, Piscataway, NJ, vol. 12, No. 1, Feb. 2005, XP011127719.

\* cited by examiner

IMPORTANCE-BASED FEC-AWARE ERROR-REPAIR SCHEDULING

TECHNICAL FIELD

Particular embodiments generally relate to networking.

BACKGROUND

Packet switched networks transport streaming media, such as video and audio, from a media source to multiple receivers. The packet switched networks, however, may use a quality-of-service scheme that may significantly delay or drop some packets. Retransmission may be used to retransmit the dropped or delayed packets to receivers. Receivers may send negative acknowledgement (NACK) messages to report that packets have not been received. After receiving the NACKs from the receivers, a retransmission server attempts to repair as many packets as possible using unicast and/or multicast retransmissions. Considering the high bandwidth nature of video streams, there is a high risk of NACK implosion on the server if every receiver asks for retransmissions during a short time period. Sending unicast retransmissions to all requesting receivers may not be feasible. Also, sending a large number of unicast retransmissions may use significantly more bandwidth than multicast retransmission.

DETAILED DESCRIPTION OF EMBODIMENTS

Overview

Particular embodiments generally relate to providing retransmission that is forward error correction (FEC) aware. In one embodiment, information is received that defines a plurality of missing packets for a media stream for a receiver. The plurality of missing packets may comprise forward error correction (FEC) packets and source packets that are missing at the receiver. A retransmission server determines one or more retransmission packets for retransmission based on knowledge of the forward error correction packets and source packets received at the receiver. In taking into account the forward error correction packets and source packets received at the receiver, retransmission of all missing source packets may not be necessary. For example, if one retransmission packet is sent, the receiver may use forward error correction packets to recover the other missing source packets. Thus, not all the missing source packets may need to be retransmitted. The one or more retransmission packets are then sent to the receiver and the receiver can use the one or more retransmission packets to recover the plurality of missing source packets.

Example Embodiments

Figure 1:
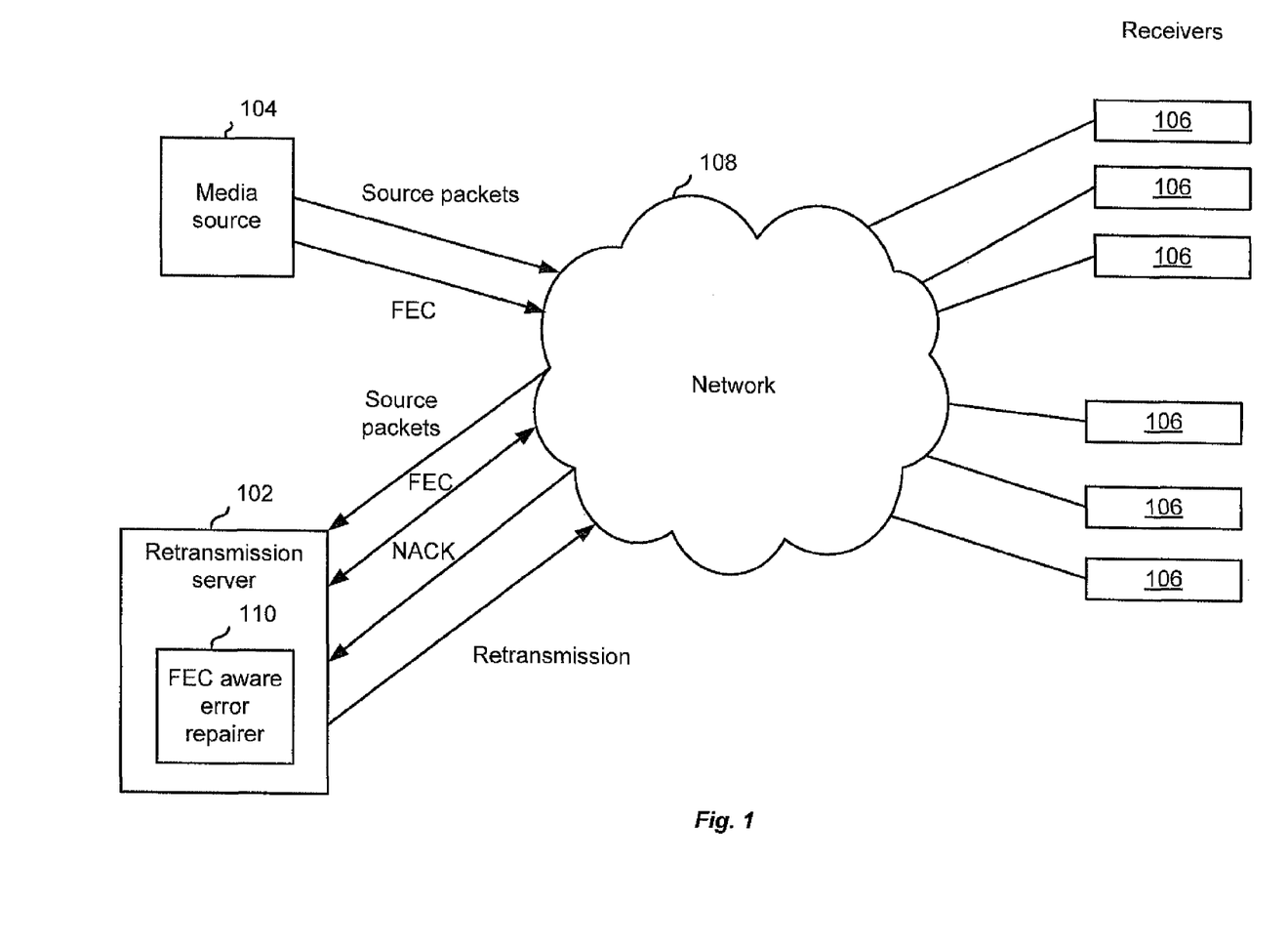
FIG. 1 depicts a simplified system for transmitting packets according to one embodiment.

FIG. 1 depicts a simplified system for transmitting packets according to one embodiment. As shown, a retransmission server 102, a media source 104, receivers 106, and network 108 are provided. It will be understood that other components of a system may be included but are not shown. Also note that media source 104 could be the same entity as retransmission server 102. For example, nodes such as routers, switches, gateways, or other network processing devices may be provided to direct packets to receivers 106.

Media source 104 is configured to output one or more media streams that include a sequence of source packets. Media source 104 may be a network device, such as a server, that is configured to send the source packets. Media source 104 may be part of a service provider network that may be streaming programming, such as television, movies, or other data. Source packets may be any packets that include data destined for receivers 106. For example, the source packets may be part of streaming video and/or audio broadcast.

Receivers 106 are configured to receive the media stream and decode it. Receivers 106 may include personal computers, set-top boxes, voice over Internet protocol (VoIP) telephones, Internet-connected televisions, cellular phones, smart phones, etc. Receivers 106 may decode the source packets and play the data as video and/or audio on a display device.

Network 108 may include a packet switched network, such as the Internet, an Internet protocol television (IPTV) network, or any other network. It will be understood that network 108 may include a number of nodes that forward packets to receivers 106.

During transmission, source packets may be dropped, lost, and/or delayed for any number of different reasons at different points in network 108. Any of these packets may be considered missing if not received after a certain time period. Media source 104 may also proactively send forward error correction (FEC) packets (i.e., sent all the time along with the original media stream) to allow receivers 106 to recover missing packets. If there are no losses among the source packets, the FEC packets may be discarded without being processed. If there are losses, receiver 106 may try to recover the missing packets by decoding the proactive FEC packets and using data in other packets that have been received to recover data for a missing packet. Forward error correction schemes are known and any schemes can be used.

Accordingly, some of the received source packets may be used to recover missing source packets. If some of the source packets are still missing after FEC-based recovery, receiver 106 then falls back to retransmission-based repair. The receiver requests retransmission of missing packets. For example, a loss report (NACK) may be sent from receivers 106 to retransmission server 102 requesting that missing packets be retransmitted.

Retransmission server 102 is configured to receive a loss report (e.g., NACK messages) when missing packets have been encountered at receiver 106. Retransmission server 102 may be separate device from media source 104 or may be integrated with media source 104. In one example, retransmission server 102 also receives a copy of the source packets and FEC packets from media source 102 when they are sent to receivers 106.

The NACK messages may report the missing packets, such as the missing source packets and/or forward error correction packets. An FEC aware error repairer 110 of retransmission server 102 is configured to send one or more retransmission packets to receivers 106. FEC aware error repairer 110 determines the packets to retransmit based on which source packets can be recovered using forward error correction packets received at receivers 106. For example, the source packets in addition to the forward error correction packets received are taken into account when determining which missing packets should be retransmitted. In one example, if two source packets are missing and one source packet is retransmitted to receiver 106, that receiver 106 may use a forward error correction packet to recover the other missing source packet. Thus, both source packets do not need to be retransmitted even if both are reported as missing by receiver 106. FEC aware error repairer 110 uses this information to determine which missing packets to retransmit. In addition to performing FEC aware error repair, relative importance of the missing packets is also taken into account when determining which packets to retransmit and when.

Figure 2:
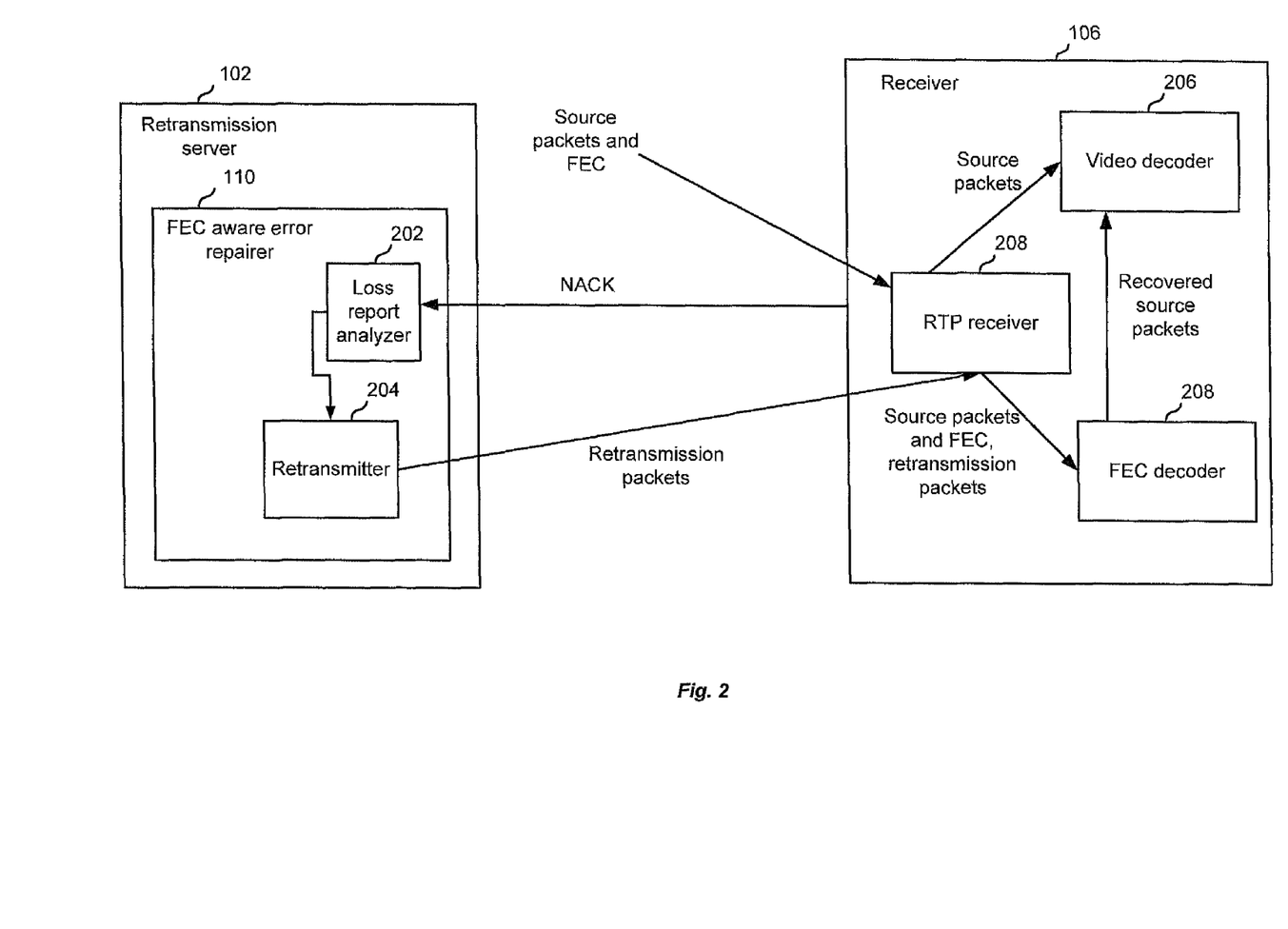
FIG. 2 depicts a more detailed example of a retransmission server according to one embodiment.

FIG. 2 depicts a more detailed example of retransmission server 102 according to one embodiment. Receiver 106 sends a loss report (e.g., a NACK packet) to retransmission server 102. In one embodiment, a loss report may detail all missing packets to retransmission server 102. In this case, if retransmission server 102 is servicing multiple receivers 106, it may optimize retransmission packets that are sent to receivers 106. For example, common retransmission packets may be multicast to different receivers 106. Also, as will be described in more detail below, the number of retransmission packets that are sent may be minimized. In a single receiver scenario, receiver 106 may not have to detail all of the missing packets to retransmission server 102. In this case, retransmission server 102 is not concerned with other receivers 106 and thus receiver 106 may just request for a missing packet that is forward error correction aware. For example, if there are two missing packets, receiver 106 may request one of the missing packets. However, there may not be a penalty for reporting all missing packets as compared to reporting a subset because a single NACK packet can report several missing packets and multiple NACKs can be packaged together in a single loss report (e.g., retransmission request) to retransmission server 102. Although missing packets are described as being identified in a NACK packet, it will be understood that any information may be sent to allow retransmission server 102 to determine which packets are missing at receiver 106. This may include sending information on the packets that were actually received, a code that can be used to determine which packets are missing, etc.

Loss report analyzer 202 is configured to analyze information in the loss report to determine which packets should be retransmitted. In one embodiment, the FEC scheme used by media source 104 is used to determine which packets to retransmit. Different FEC schemes may be used, such as a one-dimensional (1-D) parity scheme or a two-dimensional parity scheme (2-D). In the 1-D or 2-D parity schemes, a single packet may be recovered in a column or row in a group of packets using an FEC packet. These examples will be described in more detail below. Although a 1-D or 2-D FEC parity scheme is used, it will be understood that other FEC schemes may be provided. In any FEC scheme, loss report analyzer 202 takes into account the FEC scheme in determining which retransmission packets should be sent.

In one embodiment, it is expected that the number of packets retransmitted are fewer than the number of missing packets at receiver 106. Loss report analyzer 202 optimizes the number of retransmission packets that need to be sent based on the FEC scheme used. The retransmission packets can be used to recover a subset of the missing source packets using the FEC scheme at receiver 106. Different scenarios will be described in more detail below.

A retransmitter 204 then retransmits the retransmission packets to RTP receiver 208. RTP receiver 208 can then recovers the missing packets using the source packets and FEC received. When RTP receiver 208 obtains the retransmission packets, instead of directly passing them to a video decoder 206, RTP receiver 208 instead passes them to an FEC decoder 208. If all of the source packets were retransmitted, then RTP receiver 208 could forwards them straight to video decoder 206. However, because forward error correction is needed, FEC decoding is performed to recover missing packets. FEC decoder 208 may be used to recover missing source packets. For example, FEC decoder 208 uses the FEC packets that were previously sent to recover missing packets. In one example, the retransmission packet may be used in conjunction with an FEC packet and other source packets to recover another missing source packet in a row or column.

Figure 3A:
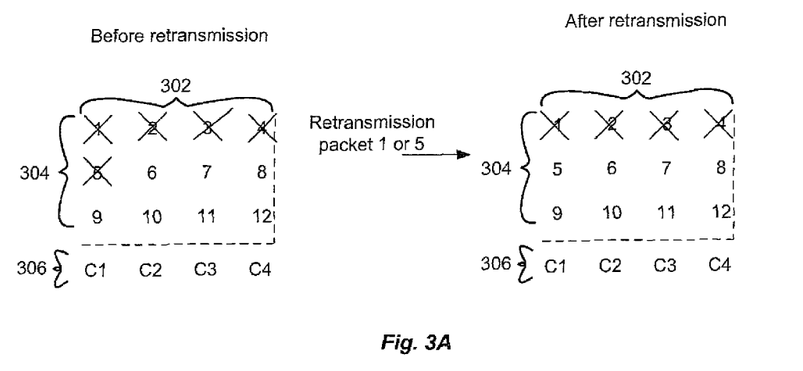
FIGS. 3A-3D depicts examples of FEC aware retransmission according to particular embodiments.

Examples of FEC aware retransmission will now be described. Although these examples are described, it will be understood that other examples may be appreciated. FIG. 3A depicts a first example according to one embodiment. In each of the following examples, either a 1-D or 2-D parity forward error correction scheme is applied to a block of source packets. In this case, a block of 12 source packets are used. However, it will be understood that other sizes of blocks may be used. The use of 4 columns is useful in a common case when, due to inherent digital subscriber line (DSL) physical layer properties, the burst duration for standard definition video is often 4 packets, but occasionally 5 packets. Thus, with a burst of 4 packets, 4 packets may be all lost. However, instead of using 5 columns all the time as one would do with a pure proactive FEC scheme, 4 columns are used, which reduces the FEC decoding latency and/or overhead of FEC. Occasional FEC failures are thus repaired by retransmissions of packets. These are design choices that may be used to decide how many columns and rows are used.

In a 1-D or 2-D parity forward error correction, each column or row can be fully recovered using an FEC packet if there is only one source packet missing in that column or row. For example, FIG. 3A shows a plurality of columns 302 and a plurality of rows 304. In this 1-D parity FEC, columns 302 include FEC packets 306. If one of the source packets is missing in a column, FEC packet 306 may be used to recover that source packet. For example, source packets 2, 3, and 4 may be recovered using FEC packets C2, C3, and C4, respectively. That is, FEC packet C2 and source packets 6 and 10 are used to recover source packet 2, FEC packet C3 and source packets 11 and 7 are used to recover source packet 3, and so on. However, source packets 1 and 5 cannot be recovered using FEC packet C1 because more than one source packets are missing in the column.

Receiver 106 can send a loss report to retransmission server 102 that would allow retransmission server 102 to determine that packet 1 or 5 should be retransmitted. In one embodiment, receiver 106 may request only packet 1 or 5. In another embodiment, receiver 106 may indicate that both packets 1 and 5 are missing. As discussed above, if receiver 106 is the only receiver receiving a media stream and retransmission server 102 does not have to take into account missing packets for other receivers 106, receiver 106 may request source packets 1 or 5. If receiver 106 is performing a local "error-repair" optimization regarding what to report/request, receiver 106 may immediately report some of the missing packets as soon as it realizes that the proactive FEC won't be sufficient. In other words, it does not have to wait until the last packet in the whole FEC block is received before requesting for missing packets that it knows it will have to request. This may allow more time for error repair.

However, if retransmission server 102 is optimizing retransmission packets for multiple receivers 106, receiver 106 reports that both source packets 1 and 5 are missing.

Accordingly, retransmission server 102 may send packet 1 or packet 5, but not both packets 1 and 5. If packet 1 is sent, then packet 5 may be recovered using FEC packet C1, source packet 9, and source packet 1. Also, if source packet 5 is sent, then source packet 1 may be recovered using FEC packet C1, source packet 9, and source packet 5. Accordingly, knowing the FEC packet C1 was received by receiver 106 and can be used to recover source packets in the column is used to determine which source packets to retransmit.

Figure 3B:
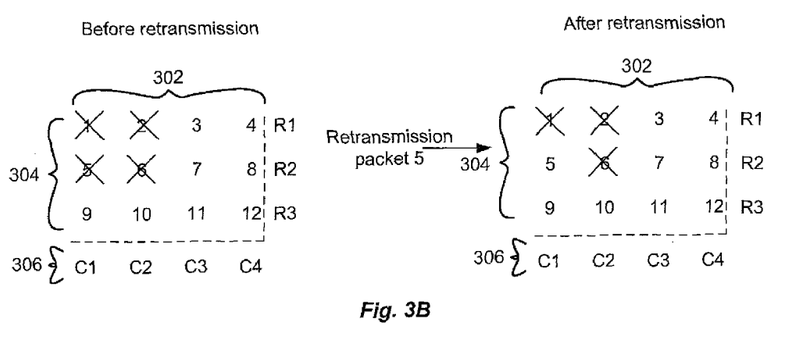

FIG. 3B depicts a second example according to one embodiment. In this case, packets 1, 2, 5, and 6 are lost. In this example, 2-D FEC is used as FEC packets R1, R2, and R3 are also proactively sent with C1, C2, C3, and C4. However, none of source packets 1, 2, 5, and 6 can be recovered using the FEC packets. Accordingly, receiver 106 sends a loss report indicating that these 4 source packets are missing.

Retransmission server 102 analyzes the loss report and determines that only one of these 4 source packets needs to be retransmitted as the 3 remaining packets can be recovered using 2-D FEC. For example, if source packet 5 is sent, source packet 1 may be recovered using FEC packet C1 and source packet 6 may be recovered using FEC packet R2. Then, source packet 2 may be recovered using FEC packet R1 or C2. Transmitting only 1 of the 4 missing packets reduces transmission overhead by 75%.

Figure 3C:
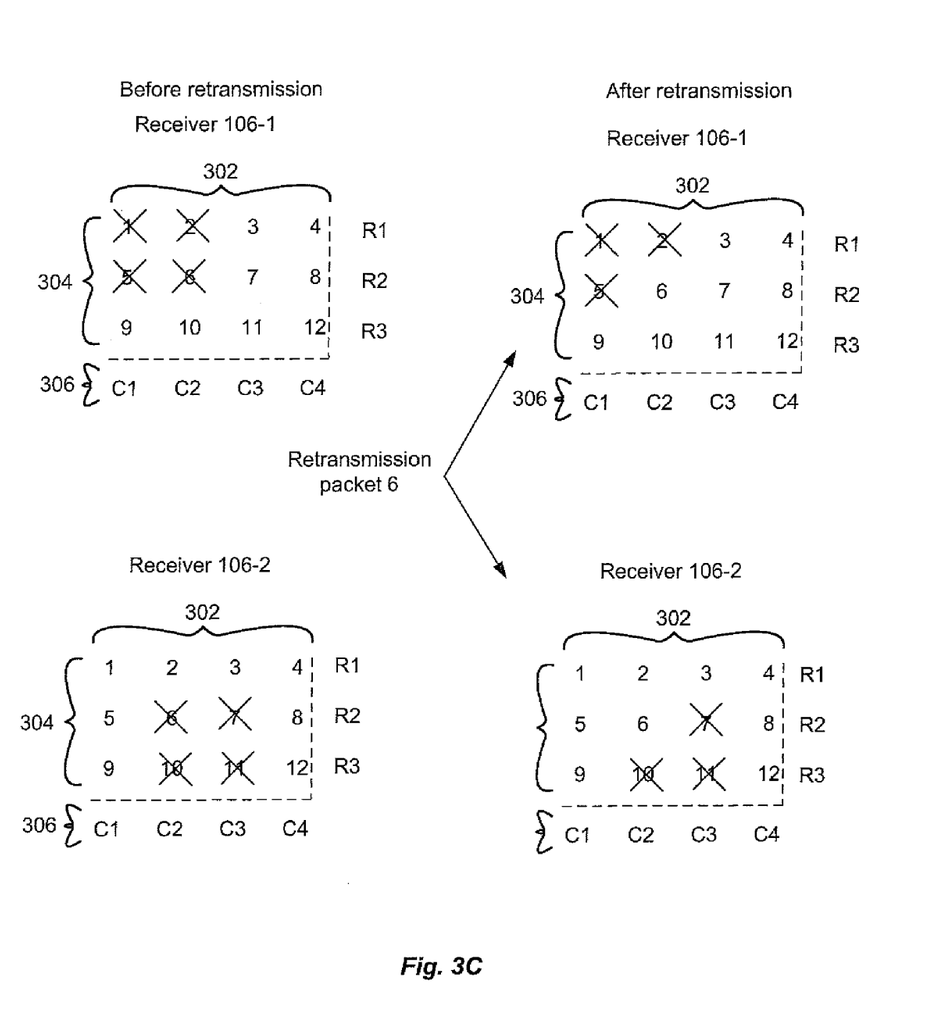

FIG. 3C depicts an example including two receivers according to one embodiment. For a receiver 106-1, source packets 1, 2, 5, and 6 are missing and receiver 106-2 is missing source packets 6, 7, 10, and 11. 2-D FEC cannot be used to recover any of these packets. Receivers 106-1 and 106-2 report the respective missing packets.

For both receivers 106-1 and 106-2, one packet may be sent that allows each receiver to recover the other three packets. This packet may be any of the missing source packets. In this case, however, the same packet may be sent using multicast that may allow both receivers 106-1 and 106-2 to recover the other three missing packets. Packet 6 is common among the missing packets for both receivers and can also be used by both receivers to recover all the missing packets. Packet 6 may thus sent to both receivers 106-1 and 106-2 through multicast. Accordingly, with one intelligently chosen multicast retransmission, all missing packets can be recovered. This is in contrast to having to send eight unicast retransmissions for all of the eight missing packets. Also, it should be understood that a multicast packet does not need to be used to recover all missing packets. Rather, the goal of multicast is to minimize unicast transmissions of packets when common packets may be sent to multiple receivers 106.

Figure 3D:
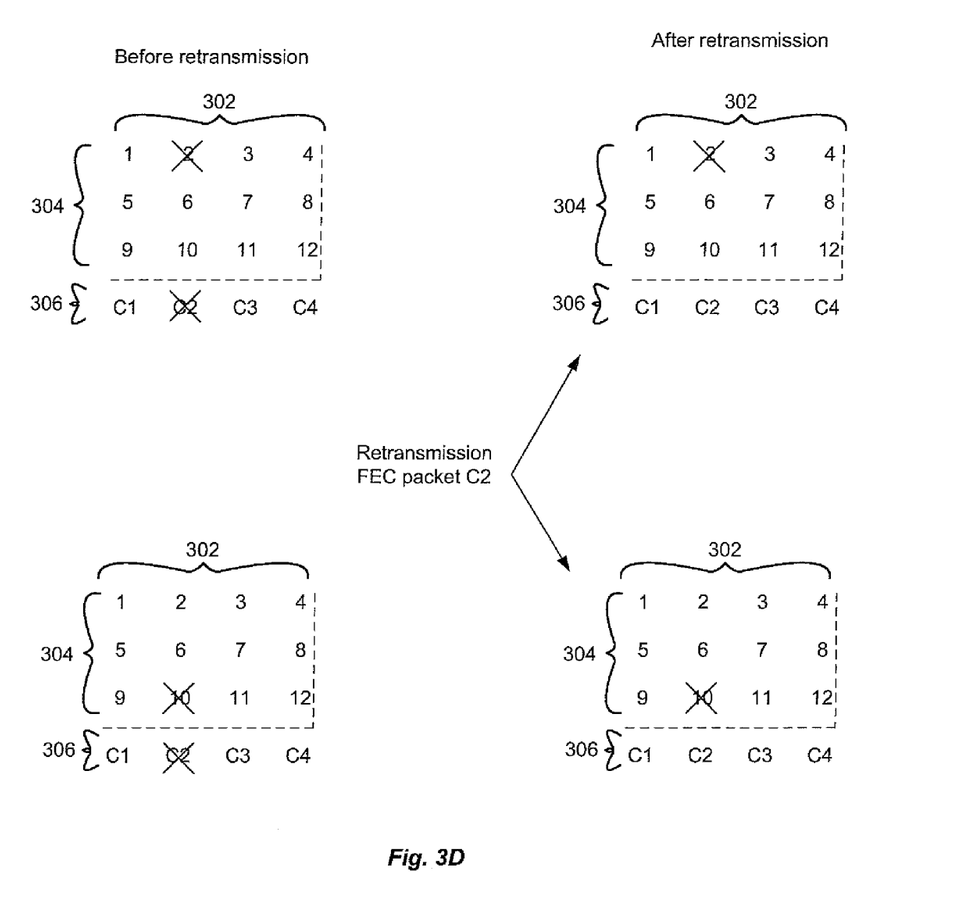

FIG. 3D depicts an example for retransmitting FEC packets according to one embodiment. Receiver 106-1 is missing packet 2 and FEC packet C2 and receiver 106-2 is missing packet 10 and FEC packet C2. 1-D FEC cannot be used by either of the receivers 106-1 or 106-2 and thus they report their missing packets.

Packet 2 and packet 10 are different packets and multicast cannot be used to send a single source packet. However, multicast may be used to send only FEC packet C2. FEC packet C2 may then be used to recover source packet 2 in receiver 106-1 and source packet 10 in receiver 106-2. Thus, with one intelligently chosen multicast retransmission, all missing source packets can be recovered by both receivers. Conventionally using a parity FEC scheme, it does not make sense to retransmit the FEC packet because for the same cost, the source packet can be retransmitted, which avoids having to use FEC recovery schemes (decoding of FEC packets and recovery of missing source packets). However, in this case, C2 is useful for both receivers 106 and thus this FEC packet is retransmitted instead of retransmitting two different source packets.

FEC packets may not be available at retransmission server 102. For example, the FEC packets may have been lost upstream or never received/requested by retransmission server 102. In some embodiments, it may be desirable to regenerate the FEC packets at retransmission server 102 to save overhead. This decision may be made intelligently by comparing the cost of sending multiple source packets versus generating and sending the FEC packet.

In addition to performing FEC aware retransmission, importance-based retransmission may be performed. For example, if retransmission server 102 services five receivers 106 and processes NACK feedback messages every one second and can only schedule two retransmissions per second, not all NACK requests may be serviced. Accordingly, retransmission server 102 may determine an importance value for the request and service the more important requests first.

In one example, two receivers 106 may report a missing packet that belongs to an I-frame and two other receivers report a missing B-frame packet during the current interval. The fifth receiver does not report any loss. An I-frame is considered a reference frame and may be more important in decoding video. If retransmission server 102 randomly selects packets to repair, the probability that retransmission server 102 will repair the I-frame packets is ⅙. While repairing a packet that belongs to an I-frame is as difficult or easy as repairing a packet belonging to a B-frame (e.g., they consume the same resources from the retransmission server's point of view), it may be better for retransmission server 102 to repair the I-frame packet first. For example, it may be easier for a decoder to conceal errors resulting from a missing B-frame packet rather than a missing I-frame packet. Accordingly, it may be desirable to ignore missing packet requests for B-frames in order to service retransmission requests for I-frames. Thus, requests for missing packets containing I-frames are given a higher importance value and may be processed first.

In another example of using importance-based retransmission, a loss report may be sent for missing packets that belong to frames that are dependent on each other. Dependent frames may have an ancestor packet that needs to be decoded before a descendent packet (i.e., the descendent packet depends on information in the ancestor packet). Retransmission server 102 may not repair the descendent packets (e.g., P-frames) before repairing the ancestor packets (e.g., I-frames). Then bandwidth available for retransmitting packets is limited and there are too many retransmission packets to be scheduled, the importance-based repair gives priority to what are considered the more important packets (ancestor packets). The scheduler may prioritize the repair packets that carry a more important payload and the packets whose decoding deadlines are sooner, over the less important and non-urgent packets. Consequently, more important packets have a higher probability of arriving at receivers 106 and can be used to play out the media.

Also, importance may be based on how many source packets can be recovered using a retransmission packet. For example, if a first retransmission packet may be directly or indirectly responsible for recovering three source packets while a second retransmission packet would only recover one packet, the first retransmission packet is sent first.

The importance-based examples show the advantages of processing the NACKs based on packet importance. Retransmission server 102 may inspect the media stream to determine which frames are I-frames in a source packet flow. This may be based on indexing information for I-frames in the media stream. Also, P and B frames may also be indexed. Thus, retransmission server 102 can distinguish between I-, P-, and B-frames and determine relative importance for the missing packet requests.

A full recovery for all missing packets at all receivers might not be possible due to several reasons including insufficient system resources, network capacity, bandwidth, time remaining to decoding deadline, etc. In such cases, the retransmission server optimizes the error-repair schedule jointly for all receivers while considering the available system and network resources, importance of the packets and decoding deadlines. This may determine which retransmission packets should be sent to recover the most packets out of the missing packets and/or provide the highest quality of experience.

Figure 4:
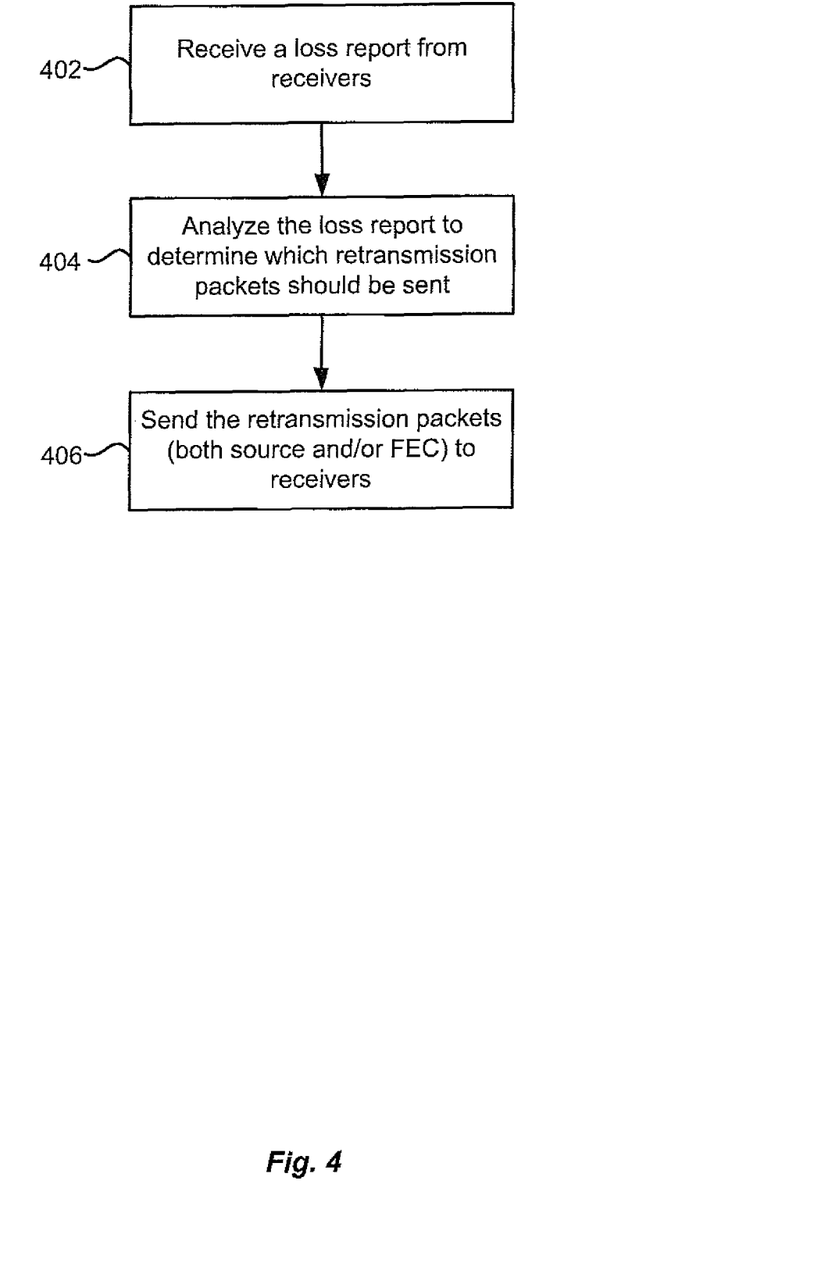
FIG. 4 depicts a simplified flowchart of a method for performing FEC-aware retransmission according to one embodiment.

FIG. 4 depicts a simplified flowchart of a method for performing FEC-aware retransmission according to one embodiment. In step 402, retransmission server 102 receives a loss report from receivers 106. In step 404, retransmission server 102 analyzes the loss report to determine which retransmission packets should be sent. For example, FEC aware repair and/or importance-based repair may be used to determine which retransmission packets should be sent. Also, whether multicast or unicast methods may be used is also considered.

In step 406, retransmission server 102 sends the retransmission packets (both source and/or FEC) to receivers 106. Receivers 106 can then recover the missing packets using the retransmission packets.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
receiving a loss report, the loss report usable to determine a plurality of missing packets in a transmission received at a first receiver, the missing packets including one or more source packets, wherein the packets in the transmission are grouped into individual blocks and each individual block is an array of packets that includes a plurality of columns and a plurality of rows, whereby a representation of single packet resides at an intersection of each column and each row of the array, and wherein a row FEC packet is assigned to each row and a column FEC packet is assigned to each column in each of the individual blocks, wherein a block loss report for a specific block is sent from the first receiver before a complete FEC scheme for the specific block is received by the first receiver;
determining one or more retransmission packets for retransmission based on a 2-D parity FEC scheme and the plurality of missing packets at the first receiver, and wherein at least one of the plurality of missing packets is not sent, such that the number of retransmission packets is less than the plurality of missing packets determined from the loss report;
determining a relative importance for the one or more retransmission packets; and
sending the one or more retransmission packets to the first receiver, wherein a retransmission packet considered to have a high relative importance is sent before other retransmission packets are sent, the one or more retransmission packets allowing the first receiver to recover at least one of the missing source packets in the one or more source packets that it is missing using the forward error correction scheme after receiving the one or more retransmission packets, wherein a combination of one or more of the one or more retransmission packets, the row FEC packet assigned to each row, and the column FEC packet assigned to each column allows for recover of each of the plurality of missing packets.

2. The method of claim 1, wherein determining the one or more retransmission packets comprises determining which of FEC or source packets need to be retransmitted to allow the first receiver to recover all the missing source packets based on the FEC scheme used, wherein the FEC or source packets determined for retransmission are a minimum number of retransmission packets that can be sent to allow all of the missing source packets to be recovered using the FEC scheme.

3. The method of claim 2, wherein determining the one or more retransmission packets comprises:

determining a retransmission FEC packet that can be used to recover a missing source packet; and sending the retransmission FEC packet instead of the missing source packet.

4. The method of claim 1, further comprising:

receiving a one or more additional loss reports that are used to determine one or more additional plurality of missing packets at one or more additional receivers, the one or more additional loss reports usable to determine a second one or more FEC packets and/or one or more source packets missing at the one or more additional receivers, wherein a plurality of the one or more source packets missing at the one or more additional receivers are different than the plurality of missing packets at the first receiver;

determining one or more retransmission packets for retransmission that can be sent to the first receiver and the one or more additional receivers based on the FEC scheme, source packets, and FEC packets received at the first receiver and the one or more additional receivers to allow the first receiver to recover at least a portion of the missing one or more source packets at the first receiver and the one or more additional receivers to recover at least a portion of the missing one or more source packets at the one or more additional receivers; and sending the one or more retransmission packets to the first receiver and the one or more additional receivers.

5. The method of claim 4, wherein the one or more retransmission packets are sent via multicast to the first receiver and the one or more additional receivers.

6. The method of claim 1, wherein determining the relative importance comprises:

determining a missing packet that carries a more important payload compared to other missing packets; and retransmitting the most important missing packet before other missing packets.

7. An apparatus comprising:

one or more processors; and logic encoded in one or more tangible media for execution by the one or more processors and when executed operable to:

receive a loss report, the loss report usable to determine a plurality of missing packets in a transmission received at a first receiver, the missing packets including one or more source packets, wherein the packets in the transmission are grouped into individual blocks and each individual block is an array of packets that includes a plurality of columns and a plurality of rows, whereby a representation of a single packet resides at an intersection of each column and each row of the array, and wherein a row FEC packet is assigned to each row and a column FEC packet is assigned to each column in each of the individual blocks, wherein a block loss report for a specific block is sent from the first receiver before a complete FEC scheme for the specific block is received by the first receiver;

determine one or more retransmission packets for retransmission based on a 1-D or 2-D parity FEC scheme and the plurality of missing packets at the first receiver, and wherein the number of retransmission packets is less than the plurality of missing packets determined from the loss report;

determine a relative importance for the one or more retransmission packets; and send the one or more retransmission packets to the first receiver, wherein a retransmission packet considered to have a high relative importance is sent before other retransmission packets are sent, the one or more retransmission packets allowing the first receiver to recover at least one of the missing source packets in the one or more source packets that it is missing using the forward error correction scheme after receiving the one or more retransmission packets, wherein a combination of one or more of the one or more retransmission packets, the row FEC packet assigned to each row, and the column FEC packet assigned to each column allows for recover of each of the plurality of missing packets.

8. The apparatus of claim 7, wherein logic operable to determine the one or more retransmission packets comprises logic operable to determine which of FEC or source packets need to be retransmitted to allow the first receiver to recover all the missing source packets based on the FEC scheme used, wherein the FEC or source packets determined for retransmission are a minimum number of retransmission packets that can be sent to allow all of the missing source packets to be recovered using the FEC scheme.

9. The apparatus of claim 7, wherein the logic when executed is further operable to:

receive a one or more additional loss reports that are used to determine one or more additional plurality of missing packets at one or more additional receivers, the one or more additional loss reports usable to determine a second one or more FEC packets and/or one or more source packets missing at the one or more additional receivers;

determine one or more retransmission packets for retransmission that can be sent to the first receiver and the one or more additional receivers based on the FEC scheme, source packets, and FEC packets received at the first receiver and the one or more additional receivers to allow the first receiver to recover at least a portion of the missing one or more source packets at the first receiver and the one or more additional receivers to recover at least a portion of the missing one or more source packets at the one or more additional receivers; and send the one or more retransmission packets to the first receiver and the one or more additional receivers.

10. The apparatus of claim 9, wherein the one or more retransmission packets are sent via multicast to the first receiver and the one or more additional receivers.

11. The apparatus of claim 7, wherein logic operable to determine the relative importance comprises logic operable to:

determining a missing packet that carries a more important payload compared to other missing packets; and retransmitting the most important missing packet before other missing packets.

12. A method comprising:

receiving a first loss report that defines a plurality of missing packets in a transmission received at a first receiver, the first loss report usable to determine one or more source packets missing at the first receiver, wherein the packets in the transmission are grouped into individual blocks and each individual block is an array of packets that includes a plurality of columns and a plurality of rows, whereby a representation of a single packet resides at an intersection of each column and each row of the array, and wherein a row FEC packet is assigned to each row and a column FEC packet is assigned to each column in each of the individual blocks, wherein a block loss report for a specific block is sent from the first receiver before a complete FEC scheme for the specific block is received by the first receiver;

receiving a second loss report that defines a plurality of missing packets at a second receiver, the second loss report usable to determine one or more FEC packets or one or more source packets missing at the second receiver or one or more FEC packets and one or more source packets missing at the second receiver;

determining one or more retransmission packets for retransmission based on a FEC scheme and the plurality of missing packets defined in the first loss report and the second loss report, wherein the one or more retransmission packets are sent to both the first receiver and the second receiver, and wherein the number of retransmission packets is less than the plurality of missing packets determined from the first loss report and the second loss report; and determining a relative importance for the one or more retransmission packets;

sending the one or more retransmission packets to the first receiver and the second receiver, wherein a retransmission packet considered to have a high relative importance is sent before other retransmission packets are sent, the one or more retransmission packets allowing the first receiver to recover at least one of the missing source packets that the first receiver is missing after receiving the one or more retransmission packets and allowing the second receiver to recover at least one of the missing source packets that the second receiver is missing after receiving one or more retransmission packets, wherein a combination of one or more of the one or more retransmission packets, the row FEC packet assigned to each row, and the column FEC packet assigned to each column allows for recover of each of the plurality of missing packets.

13. The method of claim 1, wherein a column FEC packet is assigned to each column in each of the individual blocks and a row FEC packet is assigned to each row in each of the individual blocks.

14. The method of claim 1, wherein the FEC scheme uses one or more of the FEC packet assigned to each row in each of the individual blocks.

* * * * *